United States Patent [19]
Mann

[11] 3,821,940
[45] July 2, 1974

[54] ANIMAL ACTIVATED INSECTICIDE DUST APPLICATOR

[76] Inventor: Fred W. Mann, Box 444, Waterville, Kans. 66548

[22] Filed: Feb. 26, 1973

[21] Appl. No.: 336,039

[52] U.S. Cl. .............................................. 119/159
[51] Int. Cl. ............................................. A01k 29/00
[58] Field of Search ............................. 119/157, 159

[56] References Cited
UNITED STATES PATENTS

| | | | |
|---|---|---|---|
| 3,046,942 | 7/1962 | Hale | 119/157 |
| 3,187,722 | 6/1965 | Gilmore et al. | 119/157 |
| 3,364,900 | 1/1968 | Knapp | 119/159 |

Primary Examiner—Hugh R. Chamblee
Attorney, Agent, or Firm—Fishburn, Gold & Litman

[57] ABSTRACT

An animal activated insecticide dust applicator for application of dust to an animal includes a first bag or container for storage of the dust and having a second bag or container depending therefrom and formed of porous material to permit escape or dispensing of dust therefrom. The first bag or container has discharge or delivery control structure therein activated by animal contact with the container to cause flow of dust from the first container to the second container and agitation of the second container by the animal causes dust to work through the second container and onto the animal. The structure is supported on a standard which also has an attractive media such as a support of a food supplement or the like to attract the animal.

9 Claims, 5 Drawing Figures

PATENTED JUL 2 1974

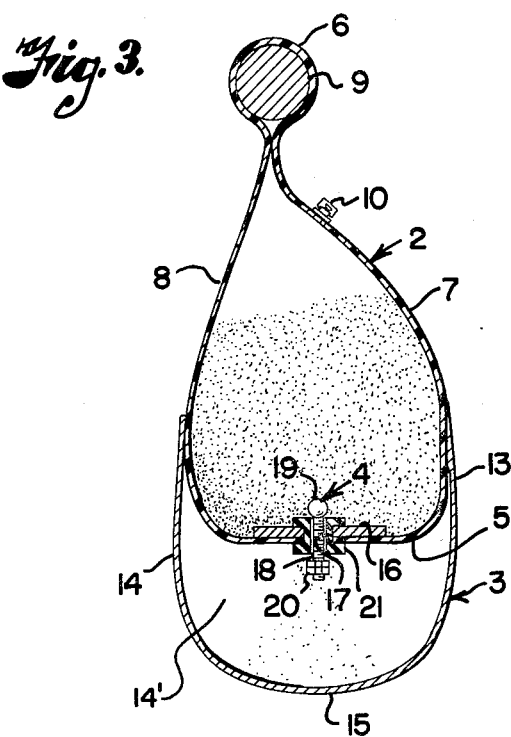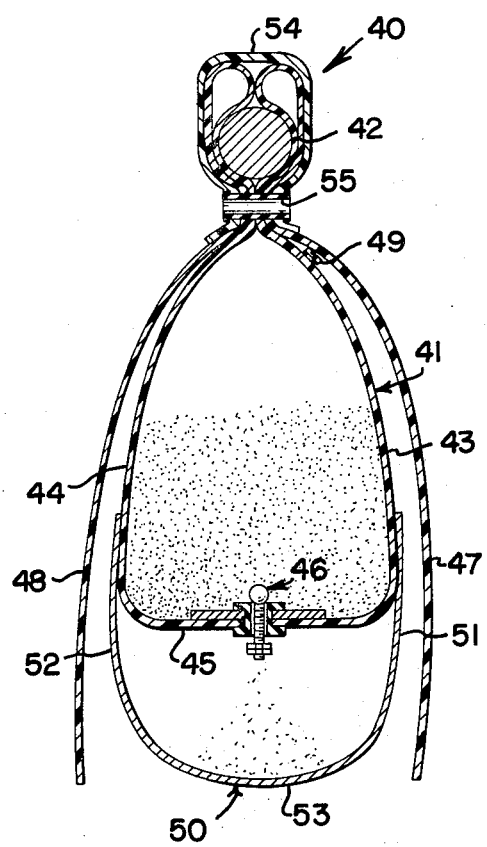

ANIMAL ACTIVATED INSECTICIDE DUST APPLICATOR

The present invention relates to animal husbandry and more particularly to an animal activated insecticide dust applicator having means to control flow of insecticide dust.

The use of semi-porous or porous cloth bags, such as burlap, is well known for dispensing insecticide dust onto animals rubbing thereagainst. Such bags release an excessive deposit of dust onto the animal and are particularly susceptible to adverse weather conditions during periods of high humidity and rain.

The principal objects of the present invention are: to provide an animal activated insecticide dust applicator adapted to dust portions of an animal with a selected quantity of dust in response to agitation of the applicator by the animal; to provide such a dust applicator adapted to meter a selected amount of dust into a porous container or bag in response to agitation by an amimal thereby cntrolling the available dust and reducing waste of dust; to provide such a dust applicator having self-closing flow permitting or valve means opened by an animal moving under the applicator; to provide such a dust applicator wherein the valve means are adapted to meter a selected amount of dust each time the valve is opened; to provide such a dust applicator having a weather shield over dust containers to thereby preserve the dust in a dry condition during storage; to provide such a dust applicator arranged in a circle around a receptacle or bin having an animal attracting material therein and positioned to apply dust to the head and neck area of the animal in response to movement of the animal toward the animal attracting material; to provide such apparatus with a suitable support and a diet supplement such as a salt block thereon under a canopy and inside an area surrounded by the dust bag and protecting same; to provide such a dust applicator wherein the relative positions of the bin or receptacle, weather shield or protection member, and flow permitting or valve means is such that animals must actuate the valve means during movement toward the bin or receptacle; and to provide such a dust applicator which is economical to manufacture, durable in construction, positive in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include exemplary embodiments of the present invention and illustrate various objects and features of the animal activated insecticide dust applicator.

FIG. 3 is an enlarged fragmentary vertical sectional view taken on line 3—3, FIG. 2 and showing a first and second dust container and self-closing flow permitting or valve means for metering flow of dust.

FIG. 5 is a vertical sectional view through a modified dust applicator adapted to be suspended in a substantially straight line.

Figure 1:
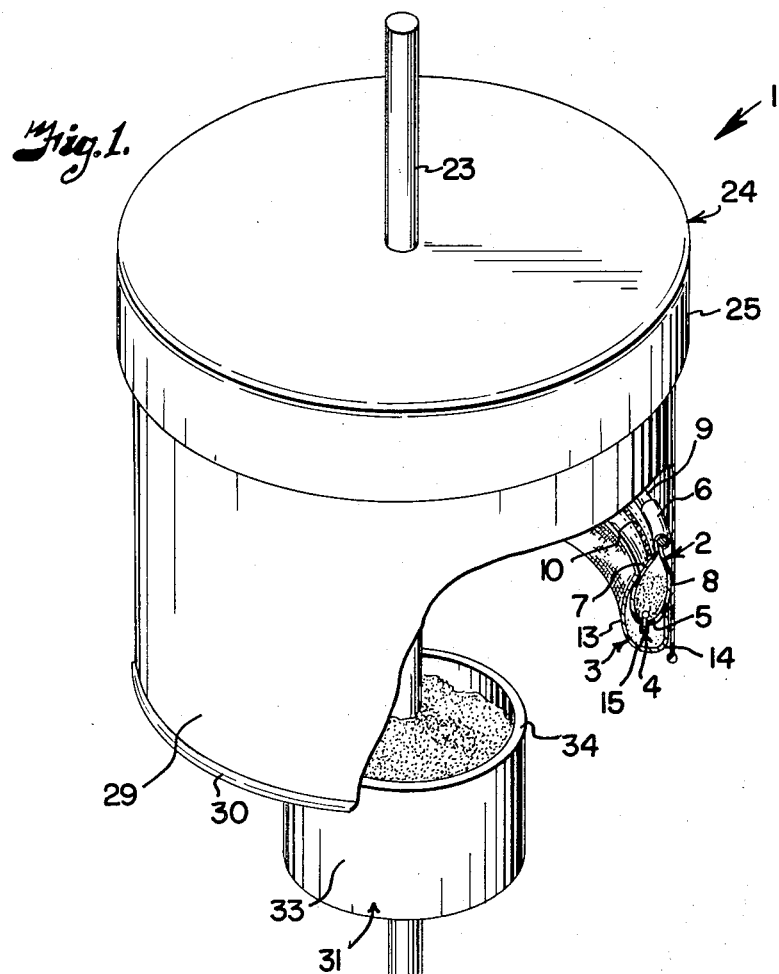
FIG. 1 is a perspective view of an animal activated insecticide dust applicator embodying features of the present invention.
Figure 2:
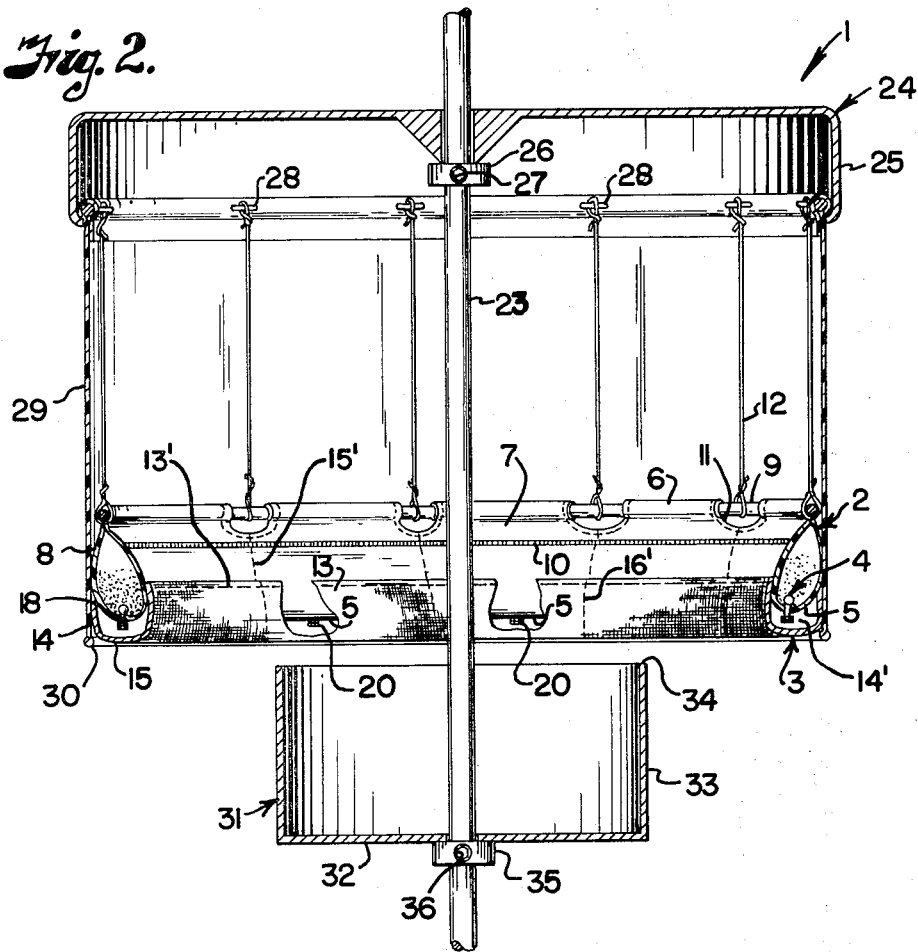
FIG. 2 is a vertical sectional view through the dust applicator with portions broken away to better illustrate the component parts.
Figure 4:
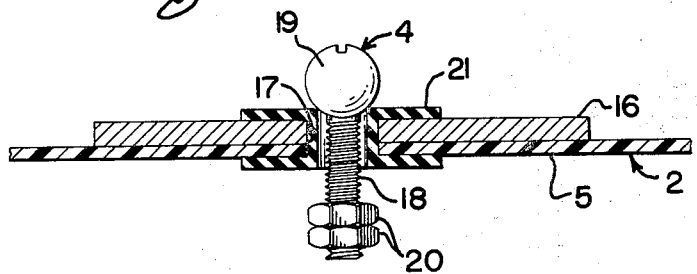
FIG. 4 is a further enlarged vertical sectional view of the valve means.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the disclosed embodiment of the present invention, the reference numeral 1 generally designates an animal activated insecticide dust applicator for application of insecticide dust to an animal engaging same. The dust applicator 1 includes a first bag or container 2 for storage of insecticide dust and a second bag or container 3 depending therefrom and formed of a flexible and porous or semi-porous material to permit escape or dispensing of dust therefrom. At least one self-closing delivery control member 4 is mounted in the first bag or container 2, as for example in the bottom 5 thereof, and is adapted to permit flow of insecticide dust into the second bag or container 3 in response to engagement of the control member 4 by an animal whereby agitation of the second container 3 causes dust to work through the second container 3 and onto the animal.

The illustrated first bag or container 2 has a top 6, opposite sides 7 and 8, and the bottom 5. A top member 9 is mounted in the top 6 of the first bag or container 2 and is preferably a substantially rigid member for supporting the first bag or container 2 and the second bag or container 3 and insecticide dust therein.

Access structure is provided in one of the sides, for example side 7, of the first bag or container 2 for permitting placing of the insecticide dust within the first bag or container 2 and for closing same. In the illustrated structure, a zipper 10 is mounted in the side 7 of the first bag or container 2.

The first container 2 is preferably formed of suitable non-porous material, such as plastic, rubber, or the like, to maintain insecticide dust within the first container 2 in a dry condition during storage.

The dust applicator 1 is suspended in a position to be engaged by animals, such as livestock, when moving thereunder and in the illustrated structure, suitable apertures 11 are positioned adjacent the top member 9 and may be formed by stitching, grommets, or like means which join the sides 7 and 8 together. The apertures 11 permit the fastening of suitable flexible hanger members 12 to the dust applicator 1 for suspending same.

The second bag or container 3 is illustrated as being mounted on and depending from the first bag or container 2 and is adapted to receive the insecticide dust from the first bag or container 2. The illustrated second bag or container 3 has opposite sides 13 and 14 suitably secured as by lines of stitching 13' to the opposite sides 7 and 8 respectively of the first container 2. The second bag or container 3 has a bottom 15 extending between the opposite sides 13 and 14 and spaced below the bottom 5 of the first container to cooperate therewith to contain dust received from said first container. The second bag or container 3 is formed of a flexible porous preferably multilayer material, such as coarse mesh cloth-like material, woven burlap or the like, to permit escape or dispensing of dust therefrom upon agitation by an animal.

In order to assure distribution of the dust around the first container, it is preferably divided into a plurality of compartments or sections by lines of sewing 15' that connect opposed portions of the sides 7 and 8. The second bag or container 3 may also be divided into a plurality of sections or compartments by sewing 16', said compartments being arranged for each to have at least one delivery control member 4 discharging therein to thereby provide flow of the dust into each section or compartment of the second bag or container 3 in response to engagement of the structure in a manner to operate the respective delivery control member 4 therein.

The delivery control member 4 is mounted in the bottom 5 of the first bag or container 2 for permitting flow of a selected quantity of the dust from the first container 2 and into the second container 3 in response to engagement of the structure in a manner to open the valve by an animal. The illustrated delivery control member 4 includes a generally horizontal retainer member 16 supported on the bottom 5 of the first bag or container 2 and having an aperture 17 therein aligned with a suitable aperture in the bottom 5.

A valve shaft 18 extends through the aperture 17 in the retainer member 16 and through the bottom 5 of the first bag or container 2. The valve shaft 18 is sized relative to the aperture 17 to permit flow of dust through the aperture 17 and around the valve shaft 18. The valve shaft 18 has a pair of spaced enlarged portions 19 and 20 positioned at upper and lower ends thereof respectively with the enlarged portions 19 being sized to close the aperture 17 in the retainer member 16.

The bottom 5 of the first bag or container 2 is protected from wear by repeated engagement by the lower enlarged portion 20 during opening of the delivery control member 4 by a suitable grommet 21 having a portion extending through the aperture 17 and overlying the retainer member 16 and a lower portion extending under the bottom 5 of the first container 2.

The valve shaft 18 is preferably threaded and has a length between the enlarged portions 19 and 20 greater than the depth of the grommet 21. Dust filters into the threaded portion of the valve shaft 18 when the upper enlarged portion 19 is raised above the grommet 21 which has an aperture therethrough preferably having a tolerance with the valve shaft 18 such that the dust will not free flow through the grommet 21 and only that portion of the threaded valve shaft 18 exposed to dust will carry dust downwardly into the respective section or compartment of the second bag or container 3 when the upper enlarged portion 19 seats on the grommet 21.

The factors controlling flow of dust into the second bag or container 3 include length of the valve shaft 18, number and pitch of threads exposed to dust when the enlarged portion 19 is raised above the grommet 21, size of the aperture through the grommet 21 relative to the size of the valve shaft 18, and the number and spacing of delivery control members 4 in each section or compartment of the first bag or container 2.

The dust applicator 1 is suspended in a position to be agitated by an animal in a manner to open the delivery control member 4 and to cause dust to work through the second bag or container 3 and onto the animal. In the structure illustrated, a suitable base 22 is adapted to be mounted on a ground surface and has an upstanding support member 23 extending upwardly therefrom.

A hood member 24 is mounted on the support member 23 and has a lower peripheral edge portion 25 thereof surrounding the support member 23. A suitable lock ring 26 is mounted on the support member 23 and is movable vertically therealong. The lock ring 26 includes suitable fastening means, such as a set screw 27 or the like, to secure the lock ring 26 in a selected position supporting the hood member 24 and thereby having the lower edge portion 25 in a selected vertical position or height relative the ground.

The hood member 24 is preferably a substantially rigid member which is adapted to provide weather protection for the dust applicator 1, such as being formed of a suitable metal including steel and aluminum.

The flexible hanger members 12 for suspending the dust applicator 1 each have their upper ends mounted on respective eyes 28 extending inwardly from the lower edge portion 25 of the hood member 24 whereby the dust applicator 1 is suspended from the lower edge portion 25 of the hood member 24. The flexible hanger members 12 are preferably formed of strong material which is weather resistant, such as rods, wire, cable, rope and the like.

A flexible shield member 29 is suitably mounted on the lower edge portion 25 of the hood member 24 and is in engagement with the dust applicator 1 and surrounds same thereby protecting the dust applicator 1 and more particularly, the second bag or container 3 from weather to maintain the dust therein in a dry condition.

The flexible shield member 29 has a lower edge 30 aligned with or slightly below the bottom 15 of the second bag or container 3. The lower edge 30 may have a suitable flexible member mounted therein to provide weight at the lower edge 30 to maintain the shield member 29 in position protecting the second bag or container 3 from the weather. The shield member 29 is also preferably formed of a non-porous material, such as plastic, rubber, or the like, thereby protecting the dust applicator 1 from the weather.

While the dispenser structure may be in a straight line as transverse to a path for the animals, the structure is also adapted to be arranged with an animal attracting media. In the structure shown, the support member 23 is substantially centered within the hood member 24 and a bin or food receptacle 31 is mounted on the support member 23 and is adapted to contain therein an animal attracting material, such as salt. The bin or receptacle 31 has a bottom 32 and a side wall 33 extending upwardly therefrom and terminating in an upper edge 34.

The bin or receptacle 31 has an aperture in the bottom 32 thereof whereby the bin 31 is movable vertically along the support member 23 and a lock ring 35 is mounted on the support member 23 and is engageable with the bottom 32 of the bin or receptacle 31 to position same at a selected spacing above the base 22, as by a suitable fastening device, such as a set screw 36.

To insure agitation of the second bag or container 3 by an animal moving toward the bin or receptacle 31 and the material therein, the lower edge 30 of the shield member 29 is substantially aligned with the bottom 15 of the second bag or container 3. The upper edge 34 of the bin or receptacle 31 is substantially aligned with the bottom 15 of the second bag or container 3 whereby an animal must agitate the second container 3 during movement toward the material in the bin or receptacle 31. To insure engagement of the structure to activate the delivery control member 4 by the animal, the spacing between the delivery control member 4 and the lower edge 30 of the shield member 29 and the bottom 15 of the second container 3 is less than the size of the animal head whereby the animal head will move a portion of the second bag or container 3 and cause same to engage the delivery control member 4 and thereby move the upper enlarged portion 19 upwardly from the retainer member 16 and move the lower enlarged portion 20 upwardly into engagement with the grommet 21 thereby closing the aperture 17. The dust from the first container 2 flows around the valve shaft 18 and when the animal moves beyond the delivery control member 4, the valve shaft 18 moves downwardly to position the enlarged portion 19 in engagement with the retainer member 16 thereby closing the aperture 17 and allowing the quantity of dust within the aperture 17 to flow into the second bag or container 3 for escape or dispensing of the dust onto an animal in response to engagement and agitation of the second bag or container 3.

FIG. 5 illustrates a modified dust applicator 40 adapted to be suspended in a substantially straight line and which includes additional features of the present invention. The dust applicator 40 includes a first bag or container 41 having a substantially rigid top member 42 mounted therein. The first bag or container 41 includes opposite sides 43 and 44 and a bottom 45 having a plurality of delivery control members 46 longitudinally spaced along the bottom 45.

The first bag or container 41 includes a pair of outer side shield members 47 and 48 overlying the opposite sides 43 and 44 respectively. A zipper 49 is mounted in one of the opposite sides for example, side 43, of the first bag or container 41 for permitting placing of insecticide dust therein and for closing the first bag or container 41.

The first bag or container 41 and the shield members 47 and 48 are all preferably formed of a flexible non-porous weatherproof material, such as plastic, rubber, or the like, for maintaining dust within the first bag or container 41 in a dry condition and for protecting a second bag or container 50 mounted on and depending from the first bag or container 41.

The second bag or container 50 is formed of a porous material including a coarse mesh fabric, such as woven burlap and includes opposite sides 51 and 52 and a bottom 53 and is thereby substantially similar to the second bag or container 3 of the dust applicator 1.

A cap member 54 is mounted on the top of the first bag or container 41 for protecting and closing the upper portion thereof. The modified dust applicator 40 has a plurality of lingitudinally spaced apertures 55 positioned below the top member 42 and the apertures are formed by stitching, grommets, or the like in a manner to secure side portions of the cap member 54, shield members 47 and 48, and the opposite sides 43 and 44 together in a weatherproof manner whereby the apertures 55 are adapted to receive suitable flexible hanger members for suspending the modified dust applicator 1.

The modified dust applicator 40 operates in substantially the same manner as the dust applicator 1 with an animal head engaging and operating at least one of the valve members 46 and agitating the second bag or container 50 to cause dispensing of insecticide dust received therein onto the head, neck, and back of the animal moving thereunder.

It is to be understood that while I have illustrated and described certain forms of my invention, it is not to be limited to these specific forms or arrangement of parts herein described and shown.

What I claim and desire to secure by Letters Patent is:

1. An animal activated insecticide dust applicator comprising:
   a. a support structure;
   b. a first bag supported by said support structure in a position to be agitated by an animal, said first bag having a top and opposite sides and being adapted to contain an insecticide dust;
   c. a second bag mounted on and depending from said first bag and having opposite sides and a bottom, said second bag being adapted to receive the insecticide dust from said first bag, said second bag being formed of flexible and porous material to permit excape of dust therefrom;
   d. means mounted in said first bag for permitting flow of dust from said first bag and into said second bag in response to engagement of said first bag by an animal;
   e. a cap member mounted on the top of said first bag;
   f. a shield member overlying at least one side of said first bag and said second bag; and
   g. means in one side of said first bag for permitting placing insecticide dust therein and for closing said first bag.

2. An animal activated insecticide dust applicator as set forth in claim 1 and including:
   a. means spaced along said first bag and connecting said opposite side thereof and dividing said bag into a plurality of dust containing sections;
   b. a flow permitting means mounted on said first bag at each section thereof.

3. An animal activated insecticide dust applicator as set forth in claim 2 wherein each of said flow permitting means conprises:
   a. a generally horizontal retainer member having an aperture therein;
   b. a valve shaft extending through the aperture in said retainer member, said valve shaft being sized to permit flow of dust through said aperture and around said valve shaft;
   c. a pair of spaced enlarged portions on said valve shaft and positioned to permit limited movement of said valve shaft in the respective aperture with an uppermost enlarged portion sized to close said aperture in said retainer member.

4. An animal activated insecticide dust applicator comprising:
   a. a support structure which includes:
      1. an upstanding support member;

2. a hood member mounted on said support member;
   3. a top member mounted in the top of said first bag; and
   4. flexible hanger means depending from said hood member and connected to said top member at spaced locations therealong;
  b. a first bag supported by said support structure in a position to be agitated by an animal, said first bag having a top and opposite sides and being adapted to contain an insecticide dust;
  c. a second bag mounted on and depending from said first bag and having opposite sides and a bottom, said second bag being adapted to receive the insecticide dust from said first bag, said second bag being formed of flexible and porous material to permit escape of dust therefrom;
  d. means mounted in said first bag for permitting flow of dust from said first bag and into said second bag in response to engagement of said first bag by an animal;
  e. a hood member mounted on said support member and having a lower edge defining a circle;
  f. a flexible shield member is mounted on said hood member and depends therefrom in overlying relation with one side of said first and second bags; and g. said support member is substantially centered within said hood member and has a bin mounted thereon and adapted to contain an animal attracting material.

5. An animal activated insecticide dust applicator as set forth in claim 4 wherein said flow permitting means comprises:
  a. a generally horizontal retainer member having an aperture therein;
  b. a valve shaft extending through the aperture in said retainer member, said valve shaft being sized to permit flow of dust through said aperture and around said valve shaft; and
  c. a pair of spaced enlarged portions on said valve shaft and each positioned at a respective end of said valve shaft and sized to close said aperture in said retainer member.

6. An animal activated insecticide dust applicator as set forth in claim 5 wherein:
  a. a lower edge of said flexible shield member is substantially aligned with the bottom of said second bag; and
  b. an upper edge of said bin is substantially aligned with the bottom of said second bag whereby an animal must agitate said second bag during movement toward the material in said bin.

7. An animal activated insecticide dust applicator as set forth in claim 6 wherein:
  a. said first bag has a bottom; and
  b. said flow permitting means comprises:
    1. a plurality of longitudinally spaced generally horizontal retainer members mounted on the bottom of said first bag and each having an aperture therein;
    2. a plurality of valve shafts each extending through the aperture in a respective one of said retainer members, said valve shafts each having a plurality of longitudinally spaced pockets thereon adapted to receive dust therein and being sized to facilitate flow of dust through said respective aperture and around said respective valve shaft therein in response to movement of the valve; and
    3. a pair of enlarged portions on each of said valve shafts and each enlarged portion being positioned at a respective end of said respective valve shaft and sized to close said aperture in said respective retainer member.

8. An animal activated insecticide dust applicator comprising:
  a. a base having an upstanding support member;
  b. a hood member mounted on said support member and having a lower peripheral edge surrounding said support member;
  c. a first bag having a top and a bottom and opposite sides, said first bag being adapted to contain an insecticide dust;
  d. a second bag mounted on and depending from said first bag and having opposite sides and a bottom, said second bag being adapted to receive the insecticide dust from said first bag, said second bag being formed of flexible and porous material to permit escape of dust therefrom;
  e. means mounted on the bottom of said first bag for permitting flow of dust from said first bag and into said second bag in response to engagement of first bag by an animal, said flow permitting means comprising;
    1. a plurality of longitudinally spaced generally horizontal retainer members mounted on the bottom of said first bag and each having an aperture therein;
    2. a plurality of valve shafts each extending through the aperture in a respective one of said retainer members, said valve shafts each being sized to permit flow of dust through said respective aperture and around said respective valve shaft therein;
    3. a pair of enlarged portions on each of said valve shafts and each enlarged portion being positioned at a respective end of said respective valve shaft and sized to close said aperture in said respective retainer member;
  f. means for suspending said first and second bags from said hood member and in a position to be agitated by an animal in a manner to open said flow permitting means and to cause dust to work through said second bag and onto the animal.

9. An animal activated insecticide dust applicator as set forth in claim 8 wherein:
  a. said first bag has a top member mounted in the top thereof;
  b. flexible hangers depend from said hood member and are connected to said top member;
  c. a flexible shield member is mounted on said hood member and depends therefrom in overlying relation with one side of said first and second bags;
  d. said support member is substantially centered within said hood member and has a bin mounted thereon and adapted to contain an animal attracting material.

* * * * *